(12) United States Patent
Chen et al.

(10) Patent No.: US 8,594,866 B1
(45) Date of Patent: Nov. 26, 2013

(54) REMOTE SENSING AND DETERMINATION OF TACTICAL SHIP READINESS

(75) Inventors: Henry Chen, San Francisco, CA (US); Philip J Ballou, Alameda, CA (US); Lang Deng, Castro Valley, CA (US); Willie Z. Cheng, San Francisco, CA (US); Jonathan David Elkin, Tiburon, CA (US)

(73) Assignee: The Boeing Company, Chicago, IL (US)

( * ) Notice: Subject to any disclaimer, the term of this patent is extended or adjusted under 35 U.S.C. 154(b) by 581 days.

(21) Appl. No.: 12/762,003

(22) Filed: Apr. 16, 2010

(51) Int. Cl.
*B60L 3/00* (2006.01)

(52) U.S. Cl.
USPC .......................................... 701/21

(58) Field of Classification Search
None
See application file for complete search history.

(56) References Cited

U.S. PATENT DOCUMENTS

| | | | |
|---|---|---|---|
| 6,014,606 A | 1/2000 | Tu |
| 6,085,147 A | 7/2000 | Myers |
| 6,259,988 B1 | 7/2001 | Galkowski et al. |
| 6,285,951 B1 | 9/2001 | Gaskins et al. |
| 6,487,477 B1 | 11/2002 | Woestman et al. |
| 6,615,130 B2 | 9/2003 | Myr |
| 6,691,007 B2 | 2/2004 | Haugse et al. |
| 6,865,476 B1 | 3/2005 | Jokerst, Sr. |
| 6,898,516 B2 | 5/2005 | Pechatnikov et al. |
| 6,917,860 B1 | 7/2005 | Robinson et al. |
| 7,209,829 B2 | 4/2007 | Litvack et al. |
| 7,243,134 B2 | 7/2007 | Bruner et al. |
| 7,471,995 B1 | 12/2008 | Robinson |
| 7,528,742 B2 | 5/2009 | Horstemeyer |
| 7,538,691 B2 | 5/2009 | Horstemeyer |
| 7,680,595 B2 | 3/2010 | Brinton et al. |
| 7,774,133 B2 | 8/2010 | Schwarzmann |
| 7,778,769 B2 | 8/2010 | Boss et al. |
| 7,807,734 B2 | 10/2010 | Kim |
| 7,860,646 B2 | 12/2010 | Bruce et al. |
| 7,876,239 B2 | 1/2011 | Horstemeyer |
| 7,892,495 B2 | 2/2011 | Huebner |
| 7,949,465 B2 | 5/2011 | Bruce et al. |
| 7,974,774 B2 | 7/2011 | Kumar |

(Continued)

FOREIGN PATENT DOCUMENTS

| | | |
|---|---|---|
| CN | 101344993 A | 1/2009 |
| EP | 1566665 | 8/2005 |

(Continued)

OTHER PUBLICATIONS

International Search Report dated Aug. 9, 2011 regarding Application No. GB1106488.8 conducted by UK searching authority.

(Continued)

*Primary Examiner* — Thomas Tarcza
*Assistant Examiner* — Adam Alharbi
(74) *Attorney, Agent, or Firm* — Yee & Associates, P.C.

(57) ABSTRACT

The different advantageous embodiments provide an apparatus comprising a sensor system, a computer system, and a satellite transceiver. The sensor system is configured to monitor time, position, heading, motions, environmental conditions, and performance data for a vessel and generate data about the vessel and an environment around the vessel. The computer system is connected to the sensor system. The computer system is configured to receive the data from the sensor system, generate vessel information about the data, and send the vessel information to a remote location. The satellite transceiver is connected to the computer system. The satellite transceiver is configured to send the vessel information to and receive other information from the remote location.

16 Claims, 7 Drawing Sheets

(56) References Cited

U.S. PATENT DOCUMENTS

| | | | |
|---|---|---|---|
| 8,108,138 | B2 | 1/2012 | Bruce et al. |
| 8,155,811 | B2 | 4/2012 | Noffsinger et al. |
| 8,180,507 | B2 * | 5/2012 | Dokken ........................ 701/21 |
| 8,391,102 | B2 | 3/2013 | Holo |
| 2006/0161337 | A1 | 7/2006 | Ng |
| 2006/0241855 | A1 | 10/2006 | Joe et al. |
| 2006/0242108 | A1 | 10/2006 | Cuspard et al. |
| 2007/0064526 | A1 | 3/2007 | Holo |
| 2007/0262855 | A1 | 11/2007 | Zuta et al. |
| 2008/0010006 | A1 | 1/2008 | Schwarzmann |
| 2008/0046280 | A1 | 2/2008 | Horstemeyer |
| 2008/0046326 | A1 | 2/2008 | Horstemeyer |
| 2008/0100475 | A1 | 5/2008 | Horstemeyer |
| 2008/0125924 | A1 | 5/2008 | Daum et al. |
| 2008/0249667 | A1 | 10/2008 | Horvitz et al. |
| 2009/0120653 | A1 * | 5/2009 | Thomas ........................ 169/61 |
| 2009/0141587 | A1 * | 6/2009 | Welker et al. .................. 367/16 |
| 2009/0161797 | A1 | 6/2009 | Cowles et al. |
| 2009/0221025 | A1 | 9/2009 | Huebner et al. |
| 2009/0271054 | A1 * | 10/2009 | Dokken ........................ 701/21 |
| 2010/0088011 | A1 | 4/2010 | Bruce et al. |
| 2010/0094496 | A1 | 4/2010 | Hershkovitz et al. |
| 2010/0174484 | A1 | 7/2010 | Sivasubramanian et al. |
| 2010/0280750 | A1 | 11/2010 | Chen et al. |
| 2011/0257819 | A1 | 10/2011 | Chen et al. |

FOREIGN PATENT DOCUMENTS

| | | |
|---|---|---|
| FR | 2760282 | 9/1998 |
| GB | 2396729 A | 6/2004 |
| JP | 01187611 | 7/1989 |
| JP | 10307042 | 11/1998 |
| JP | 2007057499 | 3/2007 |
| WO | WO2004061737 | 7/2004 |
| WO | 2004066236 A1 | 8/2004 |
| WO | WO2004097341 | 11/2004 |
| WO | 2008029221 A3 | 3/2008 |
| WO | WO2008096376 A1 | 8/2008 |
| WO | 2010008363 A1 | 1/2010 |
| WO | WO2010082989 | 7/2010 |

OTHER PUBLICATIONS

"Annex 1—Guidance on the Use of AIS Application Specific Messages", IMO AIS Binary Message Correspondence Group, Revision of the Guidance on the Application of AIS Binary Messages, Report from the AIS Binary Messages Correspondence Group, Submitted by Sweden, IMO NAV 55 conference, Jul. 2009 vislab-ccom.unh.edu/~schwehr/.../2009-Nav55-CG-AIX-Report-Annex1.pdf.
"Tender Tracker Plus Pack", nobeltec.com, Jeppesen Marine, Aug. 2008, pp. 1-2.
"How AIS Ship Tracking Works", The AIS System, BoatingSF.com, retrieved Mar. 17, 2010, 1 page www.boatingsf.com/ais_explain.php.
"Electronic purchasing—a ship supplier speaks", Digital Ship, Apr. 2006, pp. 1-7.
"AIS Overview", Navigation Center, 1 page, retrieved Mar. 17, 2010 www.navcen.uscg.gov/enav/ais/.
"AIS Guidelines, Recommendations, and Standards" 1 page, retrieved Mar. 17, 2010 www.navcen.uscg.gov/enav/ais/AIS_standards.htm.
"AIS Explained", SRT Marine Technology, pp. 1-3, retrieved Mar. 17, 2010 www.srt-marine.com/products-explained.php.
"An Iridium Story of never Say Die", Satnews Daily, pp. 1-3, retrieved Mar. 17, 2010 www.satnews.com/cgi-bin/story.cgi?number=309555710.
"Fleet Tracking, Iridium Satellite Communication", Blue Sky Network, 1 page, retrieved Mar. 17, 2010 www.blueskynetwork.com/AboutUs/AboutUs.php.
"Mobile Data Satellite News Brief", iridium, Mar. 2009 pp. 1-2 http://investor.iridium.com/releasedetail.cfm?ReleaseID=429160.
"Andrie Implements FuelTrax", press release, Mar. 9, 2009, FuelTrax Marine Fuel Management, 1 page.
Iridium Maritime News Brief, Jun. 2009, pp. 1-4, retrieved Mar. 17, 2010 www.bsl.com/extranet/Iridium/21435_Iridium_newsletter.
"Nobeltec Admiral MAX Pro Navigation Software a Comprehensive Solution for Serious Recreational Yachting", Jeppesen Marine, Portland Oregon, May 5, 2008, 1 page, retrieved Mar. 17, 2010 www.jeppesen.com/company/newsroom/articles.
U.S. Appl. No. 12/432,960, filed Apr. 30, 2009, Chen et al.
U.S. Appl. No. 12/355,152, filed Jan. 16, 2009, Chen et al.
U.S. Appl. No. 12/762,100, filed Apr. 16, 2010, Chen et al.
PCT International Search Report dated Aug. 4, 2010 regarding application PCT/US09/67375, applicant The Boeing Company, 2 Pages.
Hinnenthal "Robust Pareto—Optimum Routing of Ships Utilizing Deterministic and Ensemble Weather Forecasts," Berlin University of Technology, approved dissertation for Doctor of Engineering Sciences, Mar. 2008, 149 Pages.
"Mars Autonomy Project Path Planning", 1999, retrieved Sep. 24, 2008, 3 Pages http://www.frc.ri.cmu.edu/projects/mars/dstar.html.
"MCNAV System & Software Architecture", Team MCNAV, Carnegie Mellon University, Jul. 22, 2005, 11 Pages.
Teti et al., "Sun-Synchronous Lunar Polar Rover as a First Step to Return to the Moon", Proceedings of ISAIRAS 2006 Conference, Munich, Germany, Sep. 5-8, 2005, ESA SP-603, 8 Pages.
Thrun et al., "Stanley: The Robot that Won the DARPA Grand Challenge", Journal of Field Robotics, vol. 23, Iss. 9, Copyright 2006, pp. 661-692.
Wettergreen et al., "Robotic Planetary Exploration by Sun-Synchronous Navigation", Carnegie Mellon University, Jun. 2001, 8 Pages.
USPTO final office action dated Dec. 14, 2011 regarding U.S. Appl. No. 12/355,152, 35 Pages.
Response to office action dated Sep. 26, 2011 regarding U.S. Appl. No. 12/355,152, 15 Pages.
USPTO non-final office action dated Jun. 24, 2011 regarding U.S. Appl. No. 12/355,152, 34 Pages.
Amendment submitted with RCE dated Mar. 27, 2012 regarding U.S. Appl. No. 12/355,152, 12 Pages.
USPTO notice of allowance dated Oct. 5, 2011 regarding U.S. Appl. No. 12/244,291, 15 Pages.
Response to office action dated Aug. 23, 2011 regarding U.S. Appl. No. 12/244,291, 21 Pages.
USPTO non-final office action dated May 27, 2011 regarding U.S. Appl. No. 12/244,291, 27 Pages.
USPTO notice of allowance dated Jan. 28, 2011 regarding U.S. Appl. No. 12/872,801, 4 Pages.
Response to final office action dated Jan. 21, 2011 regarding U.S. Appl. No. 12/872,801, 8 Pages.
USPTO final office action dated Jan. 10, 2011 regarding U.S. Appl. No. 12/872,801, 4 Pages.
Response to office action dated Dec. 8, 2010 regarding U.S. Appl. No. 12/872,801, 15 Pages.
USPTO non-final office action dated Sep. 29, 2010 regarding U.S. Appl. No. 12/872,801, 10 Pages.
Preliminary amendment dated Aug. 31, 2010 regarding U.S. Appl. No. 12/872,801, 9 Pages.
USPTO notice of allowance dated Sep. 1, 2010 regarding U.S. Appl. No. 11/735,831, 8 Pages.
Response to office action dated Jul. 29, 2010 regarding U.S. Appl. No. 11/735,831, 11 Pages.
USPTO non-final office action dated Jun. 28, 2010 regarding U.S. Appl. No. 11/735,831, 12 Pages.
Bruce et al., "Vessel Routing System", U.S. Appl. No. 13/297,831, filed Nov. 16, 2011, 82 Pages.
Office Action issued on Oct. 3, 2012 for U.S. Appl. No. 12/355,152, 31 pages.
Office Action issued on Jul. 12, 2012 for U.S. Appl. No. 12/762,100, 28 pages.
Final Office Action issued on Jan. 10, 2013 for U.S. Appl. No. 12/762,100, 21 pages.
EP search report dated Mar. 1, 2013 regarding application 12182388.4, reference 1284P457EP MW, applicant The Boeing Company, 6 pages.

* cited by examiner

REMOTE SENSING AND DETERMINATION OF TACTICAL SHIP READINESS

CROSS REFERENCE TO RELATED APPLICATIONS

This application is related to commonly assigned and co-pending U.S. patent application Ser. No. 12/762,100 filed on Apr. 16, 2010 entitled "Vessel Performance Optimization Reporting Tool" all of which are hereby incorporated by reference.

BACKGROUND INFORMATION

1. Field

The present disclosure relates generally to ship operations and, in particular, to a method and apparatus for detecting and reporting ship operating status. Still more particularly, the present disclosure provides a method and apparatus for collecting and communicating important information about tactical ship and fleet readiness for operations at sea.

2. Background

Commercial or merchant vessels carry cargo, goods, passengers, and/or materials from one port to another. Commercial vessels may include, for example, general cargo ships, container ships, bulk carriers, tankers, ferries and cruise ships, and special-purpose ships. In 2009, over 50,000 commercial vessels were in operation globally. Ship owners may own several or hundreds of commercial vessels, comprising a fleet. Individual vessels or entire fleets may be operated by the ship owners themselves, or chartered by another company.

Commercial or government operated vessels also carry cargo, personnel, supplies, tactical systems, and/or other vehicles on board during deployments at sea. Such vessels may include patrol ships, sub-surface vessels, support and auxiliary vessels. Support and auxiliary vessels may include minesweepers, offshore patrol vessels, replenishment ships, and hospital ships.

Tactical readiness of a vessel or fleet is its ability and readiness to perform a specific task assignment successfully. Many factors can affect a vessel's or fleet's tactical readiness, depending on the important and critical requirements of the task it is requested to perform. These can include performance capabilities, structural integrity, fuel consumption, level of supplies, maintenance needs, proximity and behaviors of nearby shipping traffic, environmental conditions including wind, waves, currents, weather, or visibility, and platform motions in response to speed, direction, loads, and local conditions.

Assigned tasks, for example, may include transit from one location to another in a specified period of time, transportation of a specified cargo of unusually large size, high weight, or with restricted motion limits, undertaking a voyage of a lengthy distance, duration, or in inclement weather, maneuvering the vessel in tightly constrained or high traffic areas, or the launching or landing of aircraft or airborne devices from and onto the vessel.

Communication between a vessel and a remote site, such as a shore-side office or command center, is limited when the vessel is at sea due to a lack of available means of communication due to interference, for example, caused by intentional jamming or natural effects, excessive range, or absence of communication system coverage, and/or the high cost of air time using available communication. This limits both the amount and frequency of communication between vessels at sea and shore-side operations.

On many vessels, electronic data is collected onboard the vessel, and then transmitted as a single large package a few times daily. The content of these packages, and the period of their transmission, cannot be controlled or initiated by a remote site. In many cases, communication is further restricted by an officer on the ship. Electronic data is received by the vessel in a similar manner. Much of the information collected while a vessel is at sea is only available to a shore-side office once the vessel reaches a port and the information is manually transferred to a computer or personnel on shore using a shore-side communication system or direct human intervention.

In planning or executing a voyage with a specific task assignment, it is desirable to know the vessel's tactical readiness for the task, including its health, readiness, and local environmental and dynamic conditions so this information can be analyzed using onboard and/or shore-side computers and/or expert personnel, and a response containing status, recommendation, advisory information, and/or alerts can be returned to the ship operating personnel and/or onboard equipment, such as computers or tactical systems, in near real-time. The information can also be used by remote managers, such as command centers, fleet managers, or ship operators, for asset management, including safety, effectiveness, readiness, and efficiency.

Some of the information necessary to analyze vessel tactical readiness in a meaningful way is not readily available for acquisition and transmission to a remote site where resources are available to conduct such analysis. This may include navigation, operational, and/or environmental data that are restricted for security reasons to the vessel's navigation and operational control systems. Many vessels are not equipped with sensors needed to acquire certain critical data necessary to analyze their tactical readiness.

It is desirable to be able to send or receive critical information related to a vessel or fleet's tactical readiness in near real-time from the remote site to or from the vessel or fleet that contains advice or recommendations concerning special events or on procedural or operational changes that would improve the tactical readiness of the vessel. It is desirable that these transmissions or requests for information may be initiated from the remote site or the vessel itself.

Therefore, it would be advantageous to have a method and apparatus that addresses one or more of the issues discussed above.

SUMMARY

The different advantageous embodiments provide an apparatus comprising a sensor system, a computer system, and a satellite transceiver. The sensor system is configured to monitor time, position, heading, motions, environmental conditions, and performance data for a vessel and generate data about the vessel and an environment around the vessel. The computer system is connected to the sensor system. The computer system is configured to receive the data from the sensor system, generate vessel information about the data, and send the vessel information to a remote location. The satellite transceiver is connected to the computer system. The satellite transceiver is configured to send the vessel information to and receive other information from the remote location.

The different advantageous embodiments further provide a method for determining vessel or fleet tactical readiness from a remote site. A first number of data packets from a vessel is received using a satellite transceiver. The first number of data packets is decoded to retrieve collected data. The collected data is analyzed using a number of policies to determine whether the vessel meets a number of parameters required for a given task.

The different advantageous embodiments further provide an apparatus comprising a data manager and an analysis system. The data manager is configured to receive a first number of short data packets from a computer system associated with a vessel using a satellite transceiver, and decode the number of short data packets to retrieve data about at least one of the vessel and an environment around the vessel. The data manager is configured to determine whether a response is needed, and if a determination is made that the response is needed, form a second number of short data packets and transmit the second number of short data packets to the computer system associated with the vessel using the satellite transceiver. The analysis system is configured to analyze the data retrieved, determine tactical readiness of the vessel, and generate at least one of instructions, information, requests, and alerts in response to the determination of tactical readiness and the determination that the response is needed. The data manager uses at least one of instructions, information, requests, and alerts generated to form the second number of short data packets.

The different advantageous embodiments further provide a computer program product having computer usable program code stored on a computer readable storage medium. The computer usable program code is executed by a computer to receive collected data about an environment and a vessel in the environment from a sensor system configured to monitor time, position, heading, motions, environmental conditions, and performance data for the vessel, and encode the data to form a first number of short data packets. In response to a determination that a report is needed, the computer usable program code is executed by a computer to transmit the number of short data packets to a remote server using a satellite transceiver.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
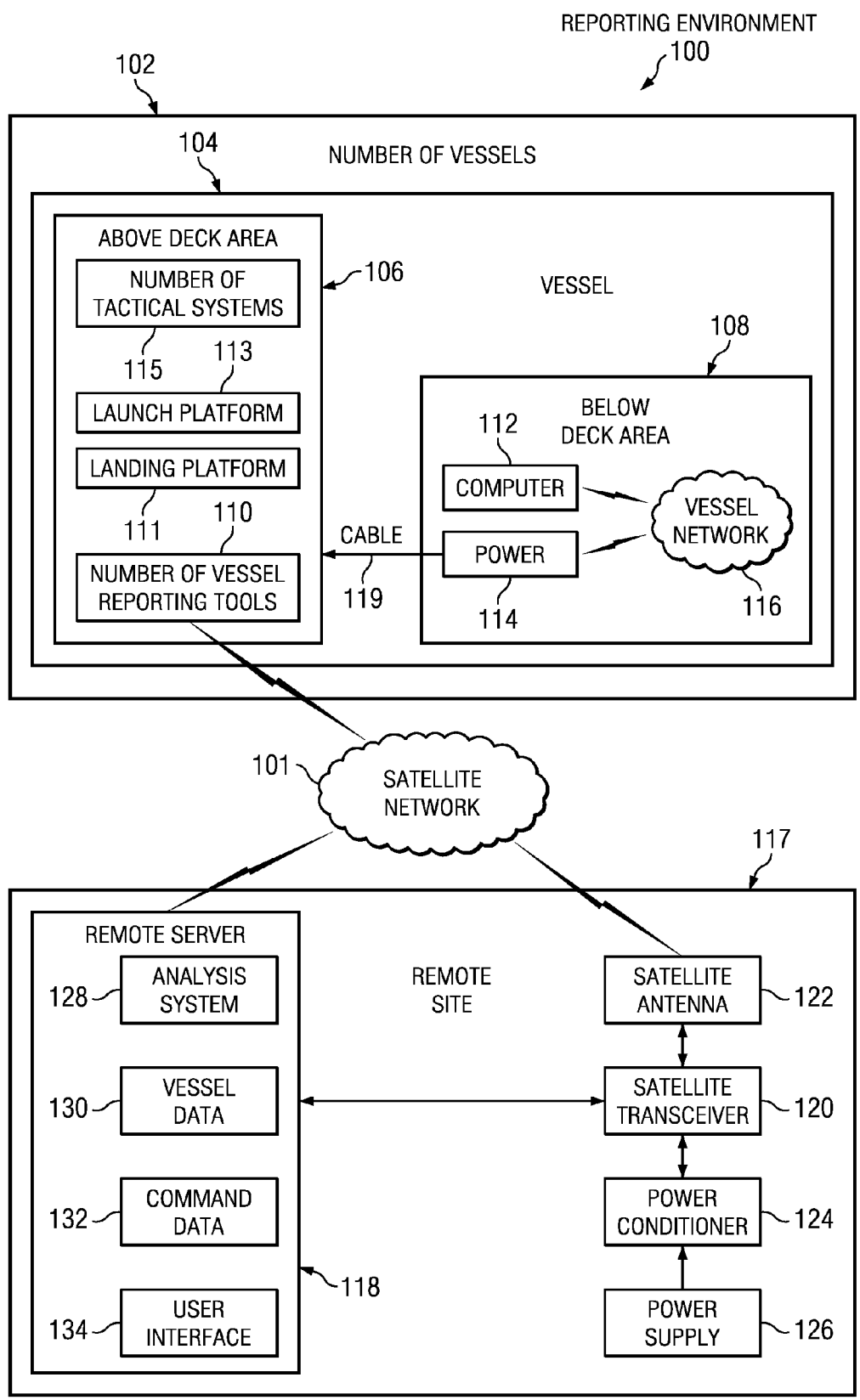
FIG. 1 is an illustration of a reporting environment in which an advantageous embodiment may be implemented.

With reference now to the figures and, in particular, with reference to FIG. 1, an illustration of a reporting environment is depicted in which an advantageous embodiment may be implemented. Reporting environment 100 may be any type of environment in which vessels operate.

Number of vessels 102 may operate in reporting environment 100. Reporting environment 100 includes satellite network 101. Satellite network 101 may be, for example, without limitation, a low earth orbit satellite constellation. A satellite constellation refers to a group of satellites working together to orbit the earth in a given pattern or configuration. Low earth orbit satellites typically maintain a circular orbit around 160-2000 kilometers (km) above the earth's surface. In comparison to geosynchronous systems (GEO), which are located at an altitude of 35,800 km above the earth, low earth orbiting satellites require less signal strength for data transmission, are more resistant to interference and jamming, have shorter delays due to their relative proximity to the ground, and depending on orbital patterns, may offer communication coverage excluded by other satellite systems. Examples of a low earth orbit satellite constellation may include, without limitation, the Iridium® and Globalstar™ systems. Iridium is a registered trademark of Iridium Satellite LLC.

Number of vessels 102 may include, for example, without limitation, cargo ships, passenger ships, military ships, leisure craft, sub-surface vessels, and/or any other suitable vessel. Vessel 104 is an illustrative example of one implementation of number of vessels 102.

Vessel 104 may include above deck area 106 and below deck area 108. Number of vessel reporting tools 110 may be implemented in above deck area 106, in this illustrative example. In one advantageous embodiment, number of vessel reporting tools 110 may be implemented on a side rail, flying bridge, and/or any other suitable portion of above deck area 106.

Above deck area 106 may also include, without limitation, landing platform 111, launch platform 113, and number of weapon systems 115, for example. Landing platform 111 may be a portion of above deck area 106 suitable for aircraft landing, for example, even while vessel 104 is at sea. Launch platform 113 may be, for example, without limitation, a portion of above deck area 106 suitable for aircraft takeoff from vessel 104, a portion of above deck area 106 accommodating number of tactical systems 115, and/or any other suitable platform for launch operations at sea.

Number of vessel reporting tools 110 is one or more tools configured to monitor a vessel and an environment around the vessel, collect information about the vessel and the environment around the vessel, generate reports using the information collected, and transmit the reports to remote server 118 of remote site 117 during a voyage and/or while the vessel is between ports. Number of vessel reporting tools 110 is configured to provide bi-directional communication between a vessel and a remote server over satellite network 101. The bi-directional communication provided by number of vessel reporting tools 110 over satellite network 101 may be a short text and/or data messaging system, in these illustrative examples.

Below deck area 108 may include, without limitation, computer 112, power 114, and access to vessel network 116. Computer 112 is an illustrative example of a vessel computer used for data processing and to monitor vessel operations and performance. Power 114 may include, without limitation, house-supplied alternating current (AC) or direct current (DC) electric power, a battery, ultra-capacitor, fuel cell, gas powered generator, photo cells, and/or any other suitable electrical power connected to the source by hardwire or wireless connection. In an illustrative embodiment, number of vessel reporting tools 110 may be powered by power 114 using cable 119, for example. Cable 119 may be, for example, without limitation, a twisted pair high signal integrity cable, such as the category 5 cable (Cat5), or inductive, optical, or other wireless connection.

In one advantageous embodiment, vessel network 116 may be, for example, a local area network (LAN). Computer 112 may connect to vessel network 116 via a hard connection or a wireless connection. Number of vessel reporting tools 110 may optionally connect to vessel network 116 as well, for example with an Ethernet or wireless connection, in some advantageous embodiments.

Number of vessel reporting tools 110 communicates with remote server 118 over satellite network 101. Remote server 118 may be any type of data processing system configured to send and receive data over satellite network 101. Remote server 118 may include programs for vessel voyage planning, in one advantageous embodiment. Remote server 118 is implemented in remote site 117 in these illustrative examples. Remote site 117 may be, without limitation, a shore-side ship operator office, fleet manager office, operations service center, a land-based command or service center connected to a land-based satellite station, a command center aboard another vessel, and/or any other remote location. In an illustrative example, remote site 117 may be a land-based command or service center connected to a land-based satellite station via at least one of wireless, cabled, or internet connections.

In an advantageous embodiment, reporting environment 100 also includes satellite transceiver 120 and satellite antenna 122. Satellite transceiver 120 may receive data from number of vessel reporting tools 110 over satellite network 101 using satellite antenna 122. Satellite transceiver 120 may transmit data received to remote server 118 in this illustrative example. Satellite transceiver 120 may be powered by power supply 126 via power conditioner 124. Power conditioner 124 is a device to configure and/or improve the quality of the power delivered to satellite transceiver 120. Power supply 126 may include, for example, without limitation, house-supplied alternating current (AC) or direct current (DC) electric power, a battery, ultra-capacitor, fuel cell, gas powered generator, photo cells, and/or any other suitable electrical power connected to the source by hardwire or wireless connection.

Remote server 118 may also include analysis system 128. In an advantageous embodiment, analysis system 128 receives vessel data 130 transmitted by number of vessel reporting tools 110, analyzes vessel data 130, and generates command data 132 in response for transmission to number of vessel reporting tools 110. In an illustrative example, analysis system 128 may generate advisory actions for number of vessels 102 that may be transmitted by remote server 118 to number of vessel reporting tools 110 during a voyage. This may allow a vessel to improve its operating status, including tactical readiness, for example.

In another advantageous embodiment, a vessel owner, fleet manager, and/or fleet commander may use user interface 134 to analyze vessel data 130 transmitted by number of vessel reporting tools 110 and generates command data 132 in response for transmission to number of vessel reporting tools 110. Command data 132 may include, for example, without limitation, launch command, vessel route update, information about aircraft projected to use vessel 104 as a landing platform, and/or any other suitable information.

In yet another advantageous embodiment, a vessel owner, operator, and/or fleet manager may use vessel data 130 received at remote server 118 from number of vessel reporting tools 110 during a voyage in asset management and validation operations. Remote server 118 collects relevant performance and environmental data transmitted by number of vessel reporting tools 110 in a near-real time operating environment as number of vessels 102 is between ports, and returns alerts and recommendations with regard to situational awareness for number of vessels 102, such as extreme weather conditions or piracy activity for example. In addition, users onboard number of vessels 102 can initiate transmission of reports, requests, or alerts to remote server 118 in the case of special events that may occur between the normally scheduled communications, for example.

The illustration of reporting environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

In some advantageous embodiments, number of vessel reporting tools 110 may be equipped with internal or above-deck power supplies or sources that reduce or eliminate the need for cable 119 to supply power from power 114, for example. In other advantageous embodiments, number of vessel reporting tools 110 may also transmit data over satellite network 101 while a vessel is at a port, in addition to while the vessel is between ports.

In other advantageous embodiments, number of weapon systems 115 may be implemented in below deck area 108, using launch platform 113 during weapon launch operations, for example. In yet other advantageous embodiments, vessel 104 may be implemented without one or more of landing platform 111, launch platform 113, and number of weapon systems 115, for example.

Figure 2:
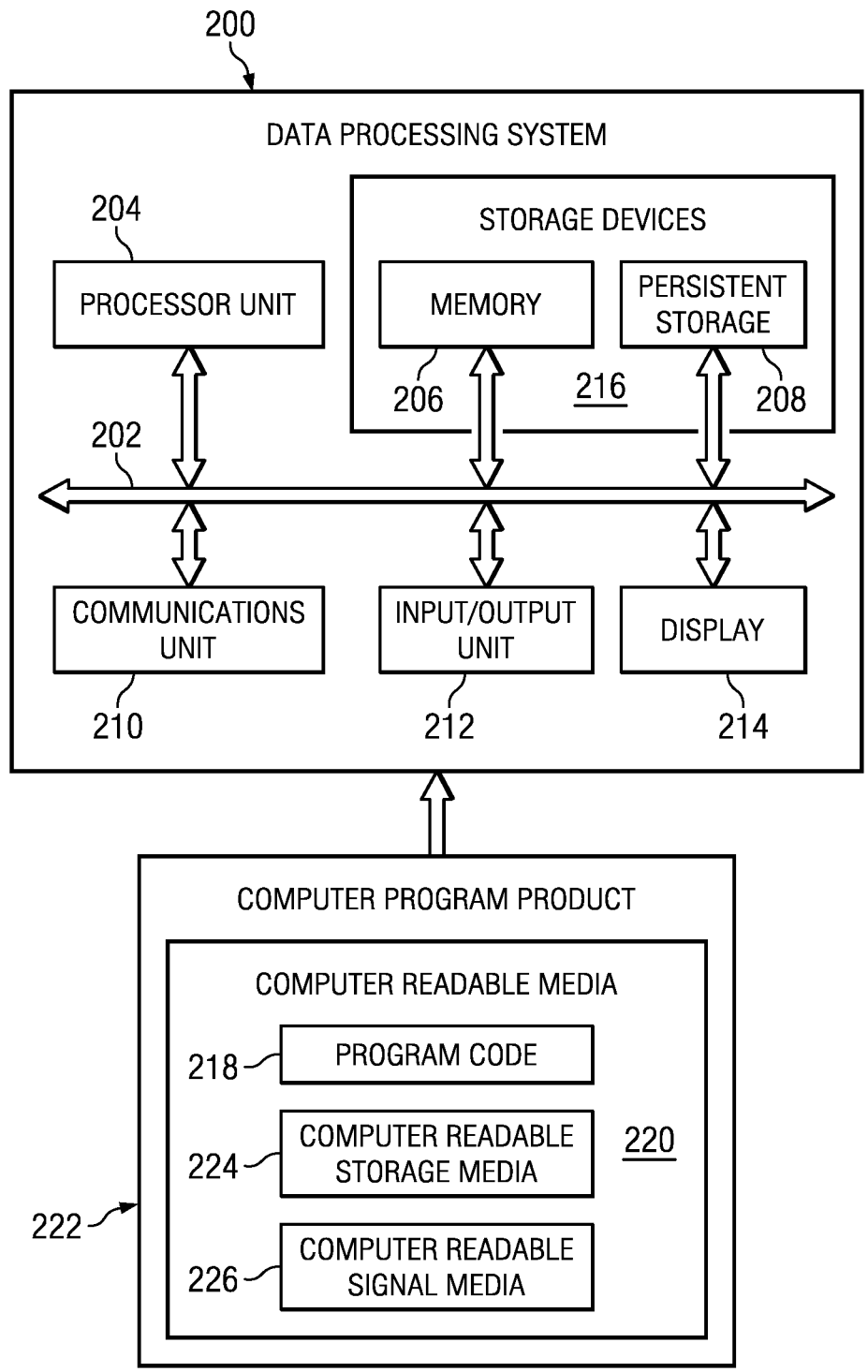
FIG. 2 is an illustration of a data processing system in accordance with an advantageous embodiment.

With reference now to FIG. 2, a block diagram of a data processing system is depicted in accordance with an advantageous embodiment. Data processing system 200 is an example of a computer, such as computer 112 remote server 118 in FIG. 1, and/or reporting system 310 in FIG. 3, in which computer usable program code or instructions implementing the processes may be located for the advantageous embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. A "number of items" as used herein with reference to an item means one or more items. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 from computer readable media 220 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current vessel reporting systems have difficulty or are poorly equipped to send and receive information to and from shore-based stations in near-real time. Normal communication links can be out of range, damaged or out of service, interrupted by interference or jamming, or too expensive to use on an extensive basis. Typically, vessel performance data is collected and stored in a database onboard the vessel's computer. Often, this stored performance data is provided shore-side only by periodic, costly, extended-duration data transmission. More commonly, this stored performance data is provided shore-side by manually copying the data onto a removable storage device when the vessel comes into port. As a result, most current reporting systems encounter significant delay in data transmission between vessel and remote site.

The different advantageous embodiments further recognize and take into account that current methods for vessel management and monitoring rely on performance data for many things, including updating operational status of a vessel and managing fleets. Interaction with the crew of a vessel is often required to obtain detailed operating status data at a remote site to efficiently manage a vessel or fleet of vessels.

The different advantageous embodiments further recognize and take into account that most current systems onboard vessels are insufficient for monitoring, recording, analyzing, and tracking vessel structural integrity and life cycle effects due to stresses and loads experienced by the ship. Current systems are constrained by inaccurate or non-existent instrumentation and/or communication limitations, and are insufficient for providing accurate position, attitude, and motion information for platforms at sea, especially in severe sea conditions and/or poor visibility conditions.

The different advantageous embodiments further recognize and take into account that information collected onboard ships is currently logged in disparate, disconnected, and unrelated methods. The systems are poorly equipped to send this information to shore-based stations for analysis and response, typically requiring the vessel to dock at a port for information transfer.

Thus, the different advantageous embodiments provide an apparatus comprising a sensor system, a computer system, and a satellite transceiver. The sensor system is configured to monitor time, position, heading, motions, environmental conditions, and performance data for a vessel and generate data about the vessel and an environment around the vessel. The computer system is connected to the sensor system. The computer system is configured to receive the data from the sensor system, generate vessel information about the data, and send the vessel information to a remote location. The satellite transceiver is connected to the computer system. The satellite transceiver is configured to send the vessel information to and receive other information from the remote location.

The different advantageous embodiments further provide a method for determining vessel or fleet tactical readiness from a remote site. A first number of data packets from a vessel is received using a satellite transceiver. The first number of data packets is decoded to retrieve collected data. The collected data is analyzed using a number of policies to determine whether the vessel meets a number of parameters required for a given task.

The different advantageous embodiments further provide an apparatus comprising a data manager and an analysis system. The data manager is configured to receive a first number of short data packets from a computer system associated with a vessel using a satellite transceiver, and decode the number of short data packets to retrieve data about at least one of the vessel and an environment around the vessel. The data manager is configured to determine whether a response is needed, and if a determination is made that the response is needed, form a second number of short data packets, and transmit the second number of short data packets to the computer system associated with the vessel using the satellite transceiver. The analysis system is configured to analyze the data retrieved, determine tactical readiness of the vessel, and generate at least one of instructions, information, requests, and alerts in response to the determination of tactical readiness and the determination that the response is needed. The data manager uses at least one of instructions, information, requests, and alerts generated to form the second number of short data packets.

The different advantageous embodiments further provide a computer program product having computer usable program code stored on a computer readable storage medium. The computer usable program code is executed by a computer to receive collected data about an environment and a vessel in the environment from a sensor system configured to monitor time, position, heading, motions, environmental conditions, and performance data for the vessel, and encode the data to form a first number of short data packets. In response to a determination that a report is needed, the computer usable program code is executed by a computer to transmit the number of short data packets to a remote server using a satellite transceiver.

Figure 3:
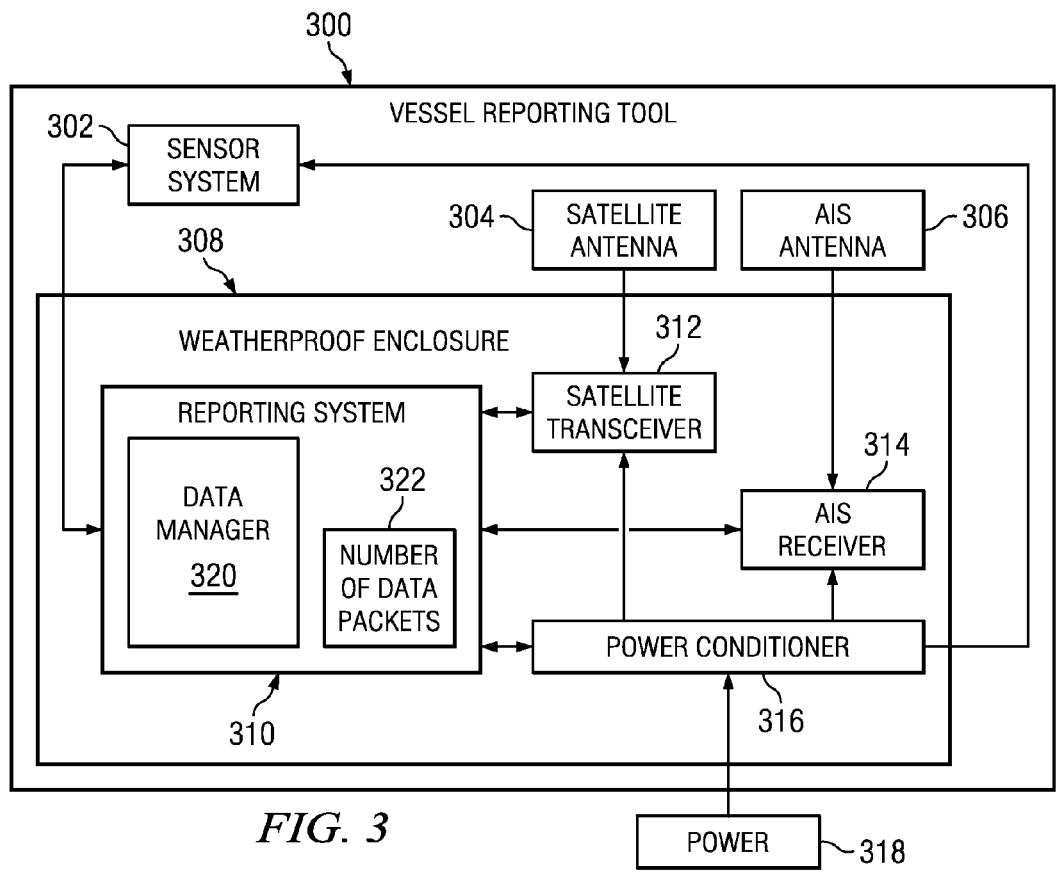
FIG. 3 is an illustration of a vessel reporting tool in accordance with an advantageous embodiment.

With reference now to FIG. 3, an illustration of a vessel reporting tool is depicted in accordance with an advantageous embodiment. Vessel reporting tool 300 is an illustrative example of one implementation of a vessel reporting tool from number of vessel reporting tools 110 in FIG. 1.

Vessel reporting tool 300 may include sensor system 302, satellite antenna 304, automatic identification system (AIS) antenna 306, weatherproof enclosure 308, reporting system 310, satellite transceiver 312, automatic identification system (AIS) receiver 314, and power conditioner 316. Sensor system 302, satellite antenna 304, and automatic identification system (AIS) antenna 306 may be implemented outside weatherproof enclosure 308. Reporting system 310, satellite transceiver 312, automatic identification system (AIS) receiver 314, and power conditioner 316 may be implemented within weatherproof enclosure 308. Power 318 may be an illustrative example of one implementation of power 114 in below deck area 108 of FIG. 1. Power 318 may provide power to one or more components of vessel reporting tool 300 through power conditioner 316. Power conditioner 316 is a device to configure and/or improve the quality of the power delivered to vessel reporting tool 300.

Sensor system 302 includes a number of sensors to detect information on vessel position, vessel orientation, vessel motion, environmental conditions, stresses and loads experienced by a vessel, and other suitable information. Satellite transceiver 312 and satellite antenna 304 are configured to receive and transmit information from a satellite network, such as satellite network 101 in FIG. 1, for example. Satellite transceiver 312 transmits information received over the satellite network to reporting system 310.

Automatic identification system (AIS) receiver 314 uses very high frequency (VHF) radio and global positioning satellite (GPS) technology to receive broadcasts from nearby vessels via automatic identification system (AIS) antenna 306. Vessel broadcasts may include, for example, vessel location, vessel speed, vessel course, vessel type, and other elements of critical safety data. Automatic identification system (AIS) receiver 314 sends information received to reporting system 310.

Reporting system 310 may be implemented using a data processing system, such as data processing system 200 in FIG. 2. Reporting system 310 includes data manager 320. Reporting system 310 receives sensor data from sensor system 302. Reporting system 310 may also receive AIS data from automatic identification system (AIS) receiver 314. Data manager 320 integrates, compresses, and encodes the data received from sensor system 302 and/or automatic identification system (AIS) receiver 314 to form number of data packets 322. Number of data packets 322 may be, for example, without limitation, short data packets configured for transmission in short data bursts. Number of data packets 322 may be transmitted by satellite transceiver 312 over a satellite network to remote servers, such as remote server 118 in FIG. 1, for example.

The illustration of vessel reporting tool 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
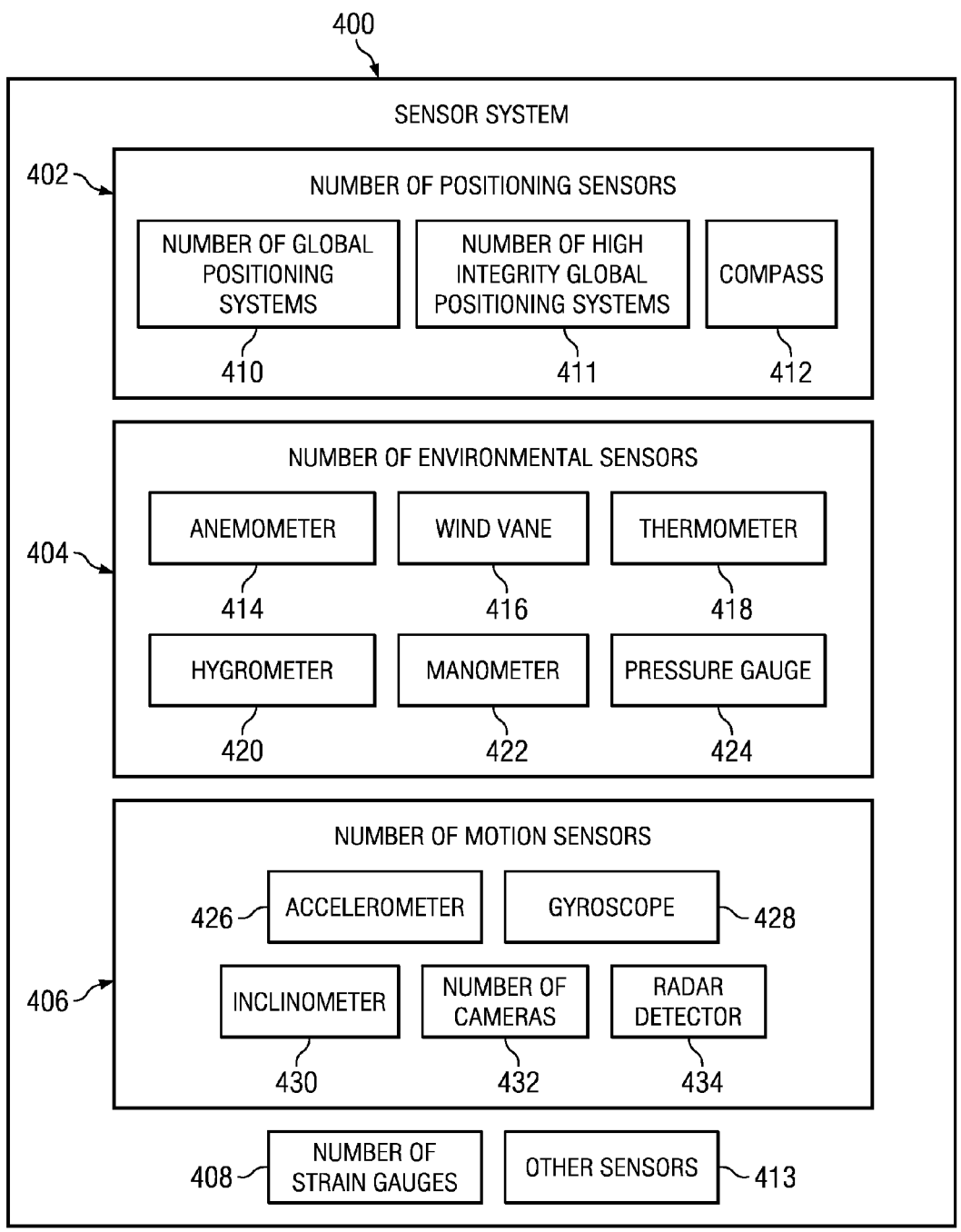
FIG. 4 is an illustration of a sensor system in accordance with an advantageous embodiment.

With reference now to FIG. 4, an illustration of a sensor system is depicted in accordance with an advantageous embodiment. Sensor system 400 is an illustrative example of one implementation of sensor system 302 of vessel reporting tool 300 in FIG. 3.

Sensor system 400 collects information about a vessel, such as vessel 104 in FIG. 1, and an environment around a vessel. The information collected by sensor system 400 is transmitted as collected data to a reporting system associated with sensor system 400, such as reporting system 310 in FIG. 3, for example. The reporting system integrates, compresses, and encodes the collected data from sensor system 400 for short burst data transmission over a satellite communication system to a remote location, such as command center 117 in FIG. 1.

Information collected by sensor system 400 may be used by command center 117 in FIG. 1 to determine vessel readiness for a specific task. A specific task may be, for example, without limitation, a tactical operation, launch operation, aircraft landing operation, re-fueling at sea, navigating in close proximity with other vessels or obstacles, performing a number of operations in poor or zero visibility conditions, and/or any other specific task.

Sensor system 400 may include number of positioning sensors 402, number of environmental sensors 404, number of motion sensors 406, number of strain gauges 408, and number of other sensors 413. Number of positioning sensors 402 may detect information about the position, heading, and speed of the vessel associated with sensor system 400. Number of motion sensors 406, number of strain gauges 408, and/or number of positioning sensors 402 may also be configured to detect information about the position, motion, orientation, flex, stress, and strain of the vessel associated with sensor system 400. Number of environmental sensors 404 may detect environmental conditions associated with an environment around the vessel.

Number of positioning sensors 402 may include, for example, without limitation, number of global positioning systems 410, number of high integrity global positioning systems 411, and compass 412. Number of global positioning systems 410 may be any type of radio frequency triangulation scheme based on signal strength and/or time of flight. Examples include, without limitation, the Global Positioning System, Glonass, and Galileo. Position is typically reported as latitude, longitude, and altitude with errors that depend on factors, such as ionospheric conditions, satellite constellation, signal latencies, interference, and signal attenuation from obstacles. Compass 412 is a device used to determine direction relative to the Earth's magnetic poles.

Number of high integrity global positioning systems 411 may be an enhanced global positioning system, such as global positioning system 410, further configured to monitor and collect information about the position, motion, orientation, flex, stress, and strain of a vessel under load. A High Integrity Global Positioning System (iGPS) is enabled by a modification to a standard satellite global positioning system (GPS) that enables second-generation GPS-aiding signals to be broadcast through an entire satellite constellation. As a result, iGPS receivers are capable of improved navigation, higher signal integrity, higher precision accuracy, and more jam-resistant capabilities. According to companies developing iGPS technology, geographic positioning data is improved to within centimeters, a vast improvement over current standalone GPS, which provides data within meters. Position typically is reported in coordinates for latitude, longitude, and altitude. Other parameters, such as time and date, may also be included.

Sensor system 400 may include a plurality of high integrity global positioning systems installed in strategic locations aboard a single vessel. In one illustrative example, information collected by number of high integrity global positioning systems 411 installed aboard a single vessel may be used to analyze and track vessel structural integrity and life cycle effects due to stresses and loads experienced by the vessel, for example. In another illustrative example, information collected by number of high integrity global positioning systems 411 installed aboard a single vessel may be used to analyze and track vessel motions relative to known a fixed global reference for the purpose of launching missiles from the vessel and/or landing manned or unmanned aircraft aboard the vessel, for example. Both of these examples may be criteria for determining a vessel's tactical readiness, for example.

Number of environmental sensors 404 may include, for example, without limitation, anemometer 414, wind vane 416, thermometer 418, hygrometer 420, manometer 422, and pressure gauge 424. Anemometer 414 is a device for measuring wind speed. Wind vane 416 is a device for measuring the direction of wind. Thermometer 418 is a device that measures temperature or temperature gradient. Hygrometer 420 is an instrument that measures relative humidity. Manometer 422 is an instrument that measures pressure, usually pressures near to atmospheric. Pressure gauge 424 may be another instrument used to measure pressure.

In one advantageous embodiment, number of environmental sensors 404 may be an integrated weather station sensor, such as the Airmar® PB200, for example. Airmar is a registered trademark of the Airmar Technology Corporation.

Number of motion sensors 406 may include, for example, without limitation, accelerometer 426, gyroscope 428, inclinometer 430, number of cameras 432, and radar detector 434. Accelerometer 426 measures the acceleration it experiences relative to freefall. Accelerometer 426 may be configured to measure the acceleration of the vessel associated with sensor system 400, for example. Gyroscope 428 measures rotation. Gyroscope 428 may be configured to measure the rotation angle and acceleration of the vessel associated with sensor system 400, for example. Inclinometer 430 is an instrument that measures angles of tilt, elevation, or inclination of an object with respect to gravity. Inclinometer 430 may be configured to measure the inclination or tilt of the vessel associated with sensor system 400, for example.

Number of cameras 432 may include, for example, without limitation, a color camera, a black and white camera, a digital camera, an infrared camera, and/or any other suitable camera. Number of cameras 432 may be configured to monitor an environment around the vessel associated with sensor system 400. In an illustrative example, number of cameras 432 may visually detect motion of other vessels in the environment. Radar detector 434 may detect electromagnetic emissions from a radar on another vessel in the environment, for example.

Other sensors 413 may include, for example, without limitation, engine performance instrumentation, engine status instrumentation, supply status instrumentation, fuel flow and/or fuel temperature monitors, sea surface temperature gauge, through-water velocity instrumentation, fluid level sensors, local and/or wave radar instrumentation, depth or echo sounder, single strain sensors, multiple strain sensors, pressure sensors, audio microphones, intrusion and/or proximity detectors, and/or any other suitable sensor for collecting data about a vessel's performance, operations, crew, supplies, and the environment around the vessel.

The illustration of sensor system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
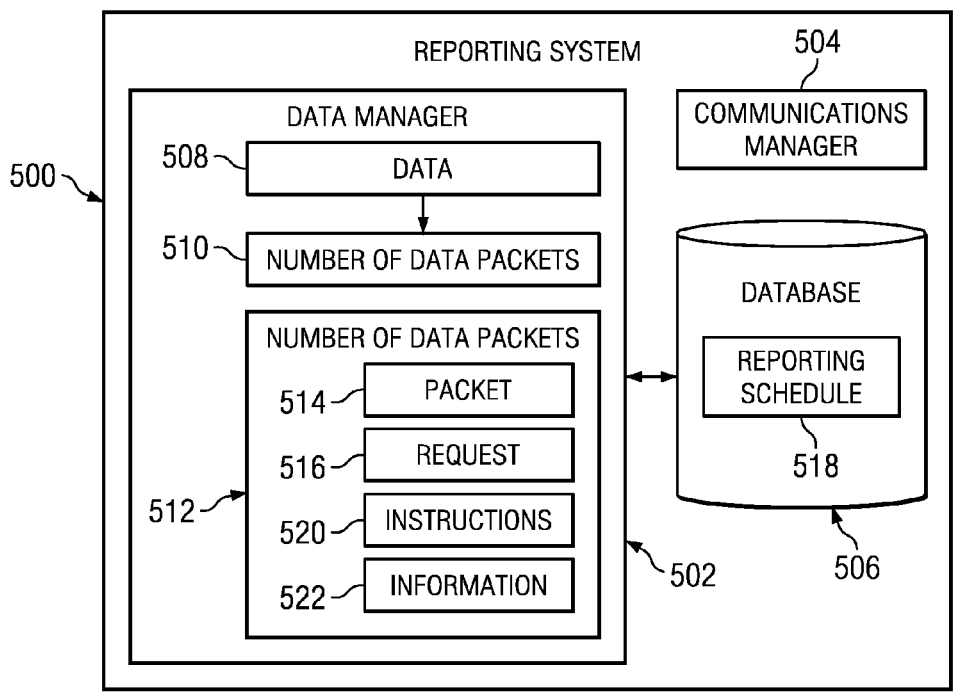
FIG. 5 is an illustration of a reporting system in accordance with an advantageous embodiment.

With reference now to FIG. 5, an illustration of a reporting system is depicted in accordance with an advantageous embodiment. Reporting system 500 is an illustrative example of one implementation of reporting system 310 of vessel reporting tool 300 in FIG. 3.

Reporting system 500 is a software process executing on a computer, such as data processing system 200 in FIG. 2. Reporting system 500 includes data manager 502, communications manager 504, and database 506. Data manager 502 is an illustrative example of data manager 320 in FIG. 3. Data manager 502 receives data 508 from sensor system 302 and/or automatic identification system (AIS) receiver 314 in FIG. 3. Data manager 502 integrates, compresses, and encodes data 508 to form number of data packets 510. Data manager 502 may use any type of encoding scheme, such as, for example, without limitation, lossless data compression, lossy data compression, and/or any other suitable encoding scheme. Number of data packets 510 may be short burst data messages, in an advantageous embodiment.

Number of data packets 510 may include information such as, for example, without limitation, shipboard conditions, encryption information for uploading or downloading large files at the next opportunity with suitable connection, emergency SOS calls, personal messages from crew members, reports of extreme weather in a local environment, reports of suspicious activity by other vessels in the environment, crew-adjusted routing information, and/or any other suitable information for transmission during a voyage. Shipboard conditions may include, for example, without limitation, motions, accelerations, tilt, roll, yaw, pitch, platform movement, engine performance, fuel flow, carbon dioxide ($CO_2$) emissions, local environmental conditions, and/or any other suitable condition. Information about shipboard conditions may be used by a command center at a remote site, such as remote site 117 in FIG. 1, to determine tactical readiness of a vessel, such as vessel 104 in FIG. 1, for example. Tactical readiness may be, for example, a vessel meeting given parameters for a specific task.

Number of data packets 510 may then be transmitted over a satellite network using a satellite transceiver, such as satellite transceiver 312 in FIG. 3. Communications manager 504 is configured to direct number of data packets 510 to the satellite transceiver for transmission. Communications manager 504 may operate to send number of data packets 510 to the satellite transceiver based on a number of factors. The number of factors may include, for example, without limitation, a reporting schedule, a remote request for a report, a local request for a report, an event that triggers an automated report generation and transmission action, satellite availability, and/or any other suitable factor.

Reporting schedule 518 in database 506 may be an example of a stored, predetermined reporting schedule. Reporting schedule 518 may be a programmable schedule that automatically initiates reports at given time intervals, for example. Reporting schedule 518 may be modified locally by a user on-board the vessel, in one example. Reporting schedule 518 may also be modified remotely through data transmission received by the vessel reporting tool from a remote server, such as remote server 118 in FIG. 1, for example.

An event that triggers an automated report generation and transmission action may include, for example, without limitation, data exceeding a preset threshold, such as a data storage threshold. In another illustrative example, reporting system 500 may be preconfigured to trigger an automated report based on detection of certain types of information. In one example, detection of a vessel in the environment that is transmitting inconsistent identification information may trigger an automated report and transmission by reporting system 500 to a remote server, in order to determine if piracy alerts should be generated and transmitted back to reporting system 500, for example.

Data manager 502 also receives number of data packets 512 from the satellite transceiver over the satellite network. Number of data packets 512 may be, for example, compressed and encoded data from a remote server, such as remote server 118 in FIG. 1. Data manager 502 may decode number of data packets 512 to retrieve the data received over the satellite network. The data may include, for example, without limitation, request 516, information 522, instructions 520, packet 514, and/or any other suitable data. Request 516 may be a request from a remote server for an unscheduled vessel report, for example. In another example, request 516 may be a request from a user on-board the vessel for a report to be generated and transmitted to a remote server. Information 522 may be data pertinent to the vessel and/or crew that data manager 502 may transmit to the vessel computer, for example. In another illustrative example, information 522 may be an updated reporting schedule to store in database 506. Instructions 520 may be instructions for adjustments to one or more components of the sensor system associated with reporting system 500, such as sensor system 400 in FIG. 4.

Communications manager 504 is also configured to maintain the integrity of satellite communication over the satellite network. Communications manager 504 monitors for available satellites in satellite network 101 of FIG. 1. When a satellite in the network is available, communications manager 504 may initiate a transmission of number of data packets 510, for example. If a connection with the satellite identified as available is broken before the transmission is complete, communications manager 504 monitors for the next available satellite, and reinitiates communication when the next available satellite is identified at the point where communication left off during the last transmission. Communication manager 504 may also monitor communications using checksums and other known methods for accuracy and completion of data transmissions.

The illustration of reporting system 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
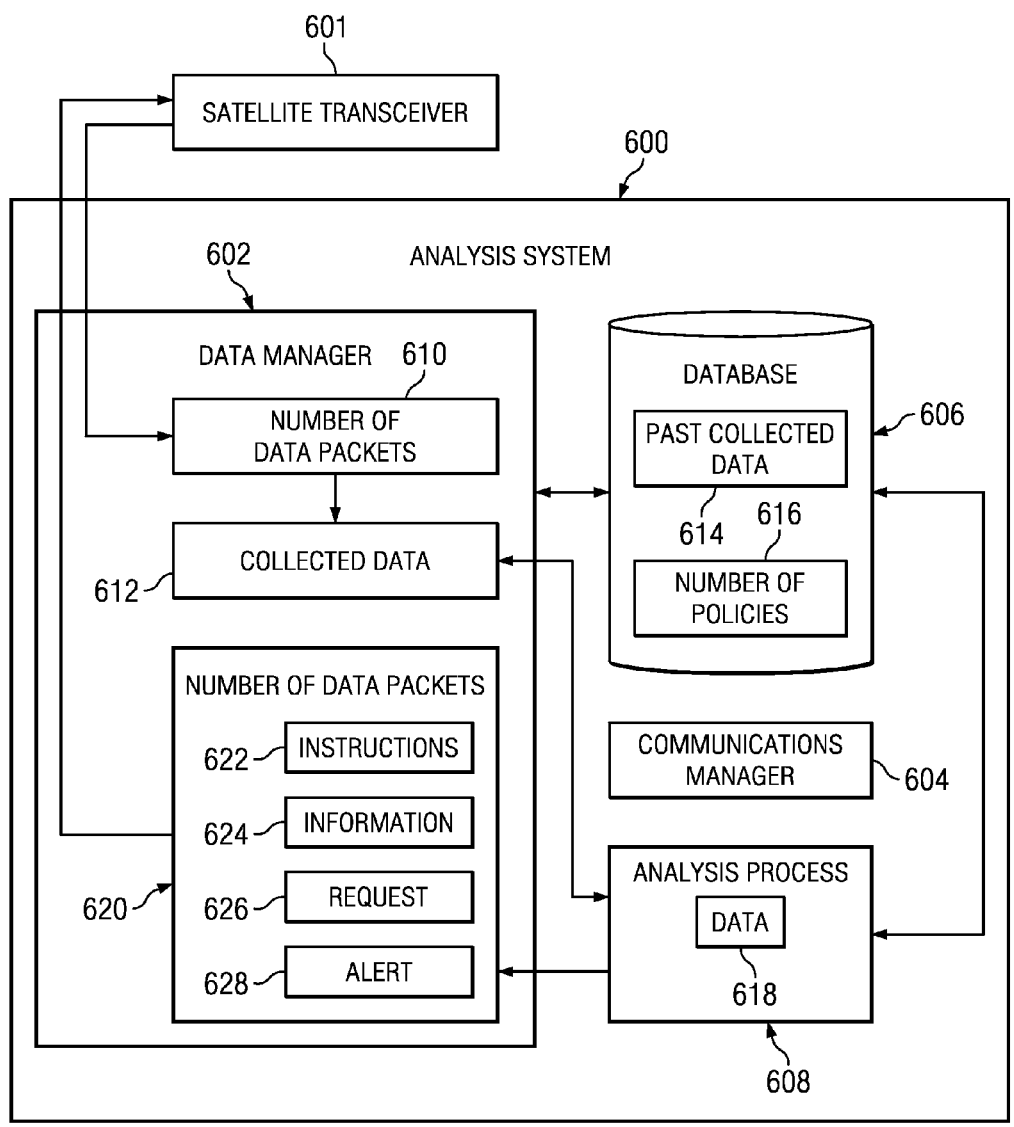
FIG. 6 is an illustration of an analysis system in accordance with an advantageous embodiment.

With reference now to FIG. 6, an illustration of an analysis system is depicted in accordance with an advantageous embodiment. Analysis system 600 is an illustrative example of one implementation of analysis system 128 of remote server 118 in FIG. 1.

Analysis system 600 includes data manager 602, communications manager 604, database 606, and analysis process 608. Data manager 602 receives number of data packets 610 via satellite transceiver 601 over a satellite network, such as satellite network 101 in FIG. 1. Data manager 602 receives number of data packets 610 from vessel reporting tools, such as number of vessel reporting tools 110 in FIG. 1 and/or vessel reporting tool 300 in FIG. 3. Data manager 602 decodes number of data packets 610 to retrieve collected data 612. Collected data 612 may be data compressed and transmitted over the satellite network by the vessel reporting tools, for example. Collected data 612 may include vessel data, environmental data, crew data, and/or any other suitable data collected by a vessel reporting tool. Number of data packets 610 may be, for example, compressed and encoded data from a reporting system of a vessel reporting tool, such as reporting system 500 in FIG. 5.

Data manager 602 may store collected data 612 in database 606 as past collected data 614, in one advantageous embodiment. Data manager 602 may also transfer collected data 612 to analysis process 608. Analysis process 608 may analyze collected data 612 using number of policies 616. Number of policies 616 may be a number of stored policies for vessel operation, for example. A policy is a set of parameters, in these examples. A policy may be, for example, without limitation, on time arrival, fuel efficiency during a voyage, following a prescribed route, safe operating standards, aircraft landing parameters, launch operations parameters, re-fueling at sea parameters, boarding a vessel at sea parameters, parameters for navigating in close proximity to a number of other vessels and/or objects, and/or any other suitable policy.

Analysis process 608 may analyze collected data 612 using number of policies 616 to determine if a vessel is operating in a manner to meet one or more policies, for example. In these examples, analysis process 608 may generate data 618 in response to the analysis of collected data 612. Data 618 may be, without limitation, information for a vessel, information for a crew, instructions for a vessel, crew, voyage, or route, advisory actions, weather information, alerts, request for additional collected data from a vessel reporting tool, and/or any other suitable type of data.

Data manager 602 receives data 618 from analysis process 608. Data manager 602 compresses and encodes data 618 to form number of data packets 620. Number of data packets 620 may include, for example, without limitation, instructions 622, information 624, request 626, alert 628, and/or any other suitable data. Instructions 622 may be, for example, without limitation, instructions to update a voyage route, instructions to alter a vessel operating parameter, instructions to adjust a number of vessel reporting tool parameters, and/or any other suitable instructions. For example, vessel operating parameters may include, without limitation, speed.

Information 624 may be data pertinent to the vessel, crew, and/or vessel computers, for example. Information 624 may include data such as, for example, without limitation, weather information for an environment around the vessel, weather information for a projected environment on a vessel route, software-enabling licensing information for certain software functionality of a vessel computer, personal short messages directed to crew members, and/or any other suitable data. In another illustrative example, information 624 may be an updated reporting schedule to store in database 506 of reporting system 500 in FIG. 5.

Request 626 may be a request for additional collected data from a number of vessel reporting tools, such as number of vessel reporting tools 110 in FIG. 1, for example. Alert 628 may be information associated with safety and/or efficiency of a vessel, environment, route, operating parameter, and/or any other suitable factor. Alert 628 may include information such as, for example, without limitation, emergency weather reports, routing advisory information, notices that a large file is waiting to be downloaded the next time the vessel has access to a broadband connection, alerts of extreme weather conditions, such as storms, typhoons, hurricanes, rogue waves, piracy activity, and/or any other suitable information. In an illustrative example, alert 628 may be generated by analysis system 600 in response to information from number of data packets 610 indicating a possible piracy concern in an environment around a vessel. In this illustrative example, alert 628 may be transmitted by analysis system 600 over satellite transceiver 601 to a number of vessel reporting tools associated with vessels in or around the environment reported.

Data manager 602 may use any type of encoding scheme to form number of data packets 620, such as, for example, without limitation, lossless data compression, lossy data compression, and/or any other suitable encoding scheme. Number of data packets 620 may be short burst data messages, in an advantageous embodiment.

Communications manager 604 is configured to direct number of data packets 620 to satellite transceiver 601 for transmission. Communications manager 604 is also configured to maintain the integrity of satellite communication over the satellite network.

The illustration of analysis system 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
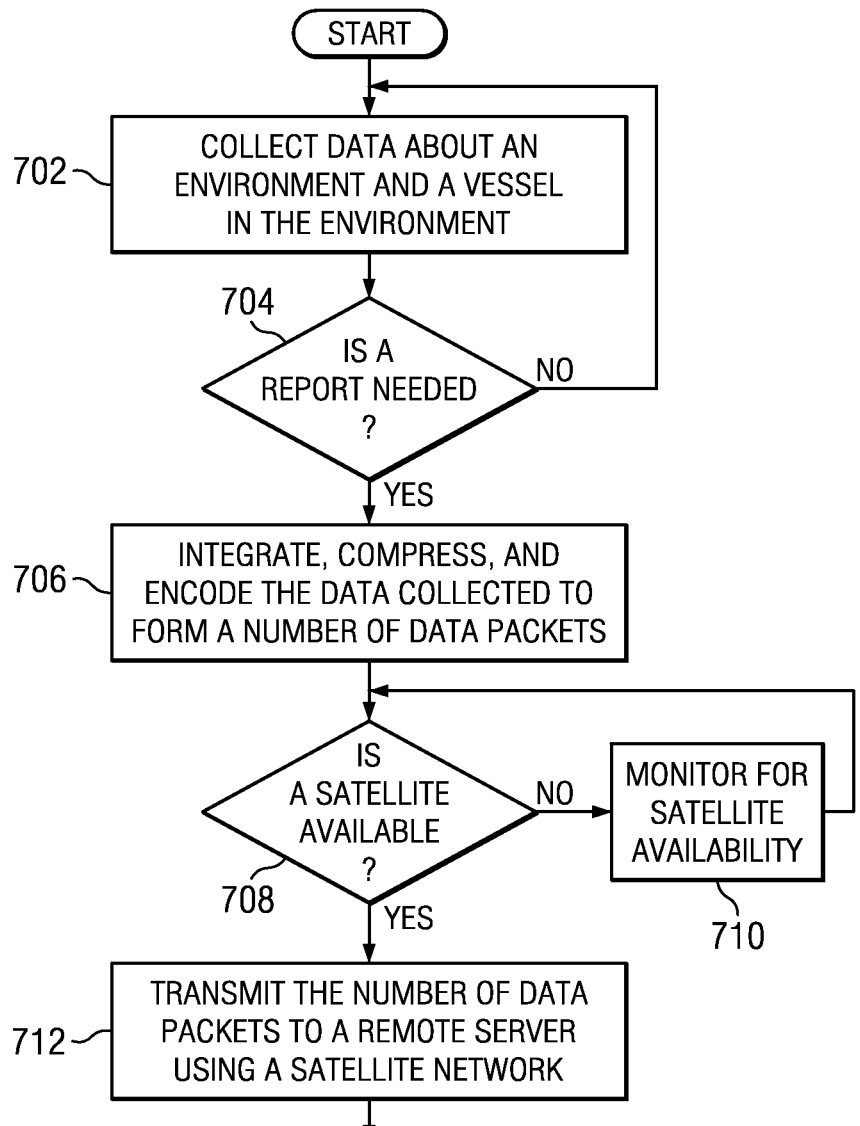
FIG. 7 is an illustration of a flowchart illustrating a process for vessel reporting in accordance with an advantageous embodiment.

With reference now to FIG. 7, an illustration of a flowchart illustrating a process for vessel reporting is depicted in accordance with an advantageous embodiment. The process in FIG. 7 may be implemented by a component such as vessel reporting tool 300 in FIG. 3.

The process begins by collecting data about an environment and a vessel in the environment (operation 702). The vessel may be vessel 104 in FIG. 1, for example. The vessel may be between ports, in this illustrative example.

The process determines whether a report is needed (operation 704). The process may determine whether a report is needed using a reporting schedule stored in a database, such as reporting schedule 518 in FIG. 5, in one illustrative example. In this example, the reporting schedule may be a programmable schedule that automatically initiates reports at given time intervals. In another illustrative example, the process may receive a request for a report from a remote site, such as remote server 118 in FIG. 1. In yet another illustrative example, the process may receive a local request for an unscheduled report or receive a modified reporting schedule, for example. In this example, the local request may be initiated by a user on-board the vessel. In still another illustrative example, the process may receive an unscheduled, automated alert triggered by an event that requires a report, such as data exceeding a preset threshold or a detector switch, for example. The preset threshold may be a data storage threshold, for example, that triggers data transmission through a report to a remote server for data storage at the remote server.

If a determination is made that the report is not needed, the process returns to operation 702. If a determination is made that the report is needed, the process integrates, compresses, and encodes the data collected to form a number of data packets (operation 706). The process then determines whether a satellite is available (operation 708) for transmission of the data packets. The process may use a communications manager, such as communications manager 504 in FIG. 5, to determine whether a satellite in satellite network 101 of FIG. 1 is available for transmission of data.

If a determination is made that a satellite is not available, the process monitors for satellite availability (operation 710), returning to operation 708 when an available satellite is detected. If a determination is made that a satellite is available, the process transmits the number of data packets to a remote server using a satellite network (operation 712), with the process terminating thereafter.

The number of data packets may be transferred all together, or in portions as the satellite availability allows. For example, if a portion of the number of data packets is transmitted when a satellite becomes available, but the transmission is interrupted when the satellite is no longer available, the process may identify the portion of the number of data packets that have not been transmitted and transmit the remaining portion when the next available satellite is detected. The network may be a satellite network, such as satellite network 101 in FIG. 1.

Figure 8:
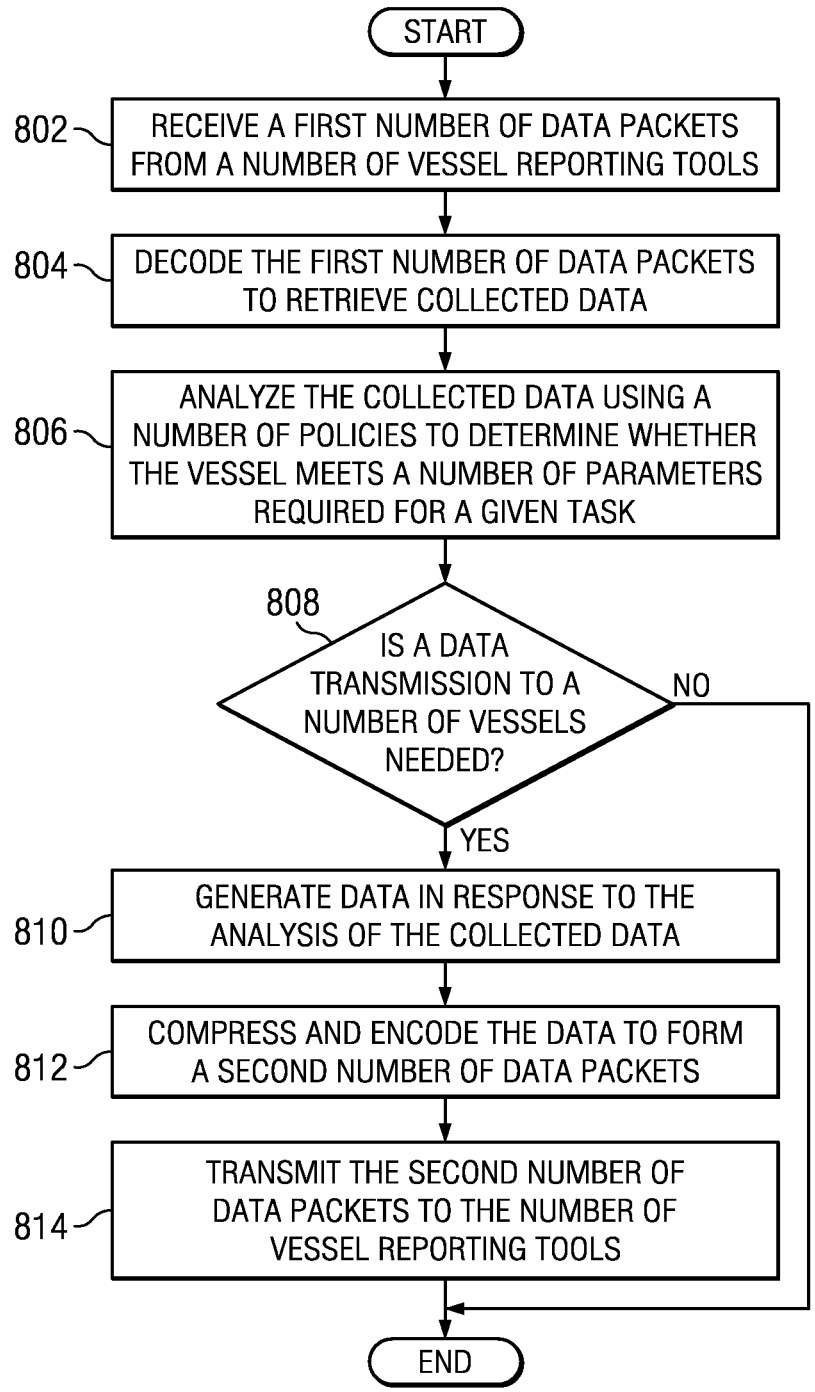
FIG. 8 is an illustration of a flowchart illustrating a process for determining tactical readiness in accordance with an advantageous embodiment.

With reference now to FIG. 8, an illustration of a flowchart illustrating a process for data analysis is depicted in accordance with an advantageous embodiment. The process in FIG. 8 may be implemented by a component such as analysis system 128 in FIG. 1 and/or analysis system 600 in FIG. 6.

The process begins by receiving a first number of data packets from a number of vessel reporting tools (operation 802). The first number of data packets may be, for example, number of data packets 610 in FIG. 6 and/or number of data packets 510 in FIG. 5. The process decodes the first number of data packets to retrieve collected data (operation 804). The collected data may be data collected by a number of vessel reporting tools during a voyage or between ports, for example. The collected data may be data collected using a sensor system, such as data 508 in FIG. 5.

The process analyzes the collected data using a number of policies (operation 806). The number of policies may be one or more sets of parameters relating to vessel operations, for example. A policy may be, for example, without limitation, on time arrival, fuel efficiency during a voyage, following a prescribed route, safe operating standards, aircraft landing parameters, launch operations parameters, re-fueling at sea parameters, boarding a vessel at sea parameters, parameters for navigating in close proximity to a number of other vessels and/or objects, and/or any other suitable policy.

The process determines whether a data transmission to a number of vessels is needed (operation 808). A data transmission may be needed in order to update a reporting schedule, provide weather information, provide updated route information, alert a vessel and/or crew to environmental conditions, request additional collected data, give a launch command, alert a vessel to updated mission guidelines, alert a vessel to an incoming aircraft intending to land on the vessel at sea, request to retransmit the previous report due to errors or interruption of the previous transmission, and/or any other suitable reason.

If a determination is made that no data transmission is needed, the process terminates. If a determination is made that the data transmission to the number of vessels is needed, the process generates data in response to the analysis of the collected data (operation 810). The data generated in response may be, without limitation, information to correct an operating parameter of a vessel, information to alert a vessel or crew to environmental factors relevant to a vessel route or position, a request for additional collected data needed to determine whether a number of policies are met, and/or any other suitable data.

The process compresses and encodes the data to form a second number of data packets (operation 812). The process then transmits the second number of data packets to the number of vessel reporting tools (operation 814), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current vessel reporting systems have difficulty or limited capability for sending and receiving information to and from remote stations due to the high cost of air time and/or unavailability of suitable communication systems. Typically, vessel performance data is collected and stored in a database onboard the vessel's computer. Normally, this stored performance data is provided to remote stations only by periodic, costly, extended-duration data transmission or is offloaded from the vessel by manually copying the data onto a removable storage device when the vessel comes into port. As a result, current reporting systems incur significant expense and/or encounter significant delay in data transmission from vessel to a remote station.

The different advantageous embodiments further recognize and take into account that current methods for vessel management and monitoring rely on performance data for many things, including updating operational status of a vessel, managing fleets, and determining vessel or fleet tactical readiness. Interaction with the crew of a vessel is often required to obtain detailed performance data shore-side or at another remote site, to efficiently manage a vessel or fleet of vessels.

Thus, the different advantageous embodiments provide an easy-to-install, low-cost tool for asset management, tracking, and verification by vessel owners, operators, fleet managers, and the like. The vessel reporting tool allows for accurate and timely remote monitoring of vessel operating status, including tactical readiness at lower cost and in a more timely manner than is currently possible. By providing automated updating of vessel computer performance models used in optimization software, the accuracy of simulation results can also improve. The different advantageous embodiments also provide a tool that can receive advisory feedback in near-real time from a remote site and increase situational awareness for a vessel and crew, for example, with regard to piracy activities in the local vicinity.

The easy-to-install apparatus is configured to allow very low cost communication exchange in near real-time between vessels at sea and remote sites. The communication exchange may include information concerning vessel and fleet operational status for the purpose of improving the vessel's and/or fleet's operating safety, efficiency, and performance. The apparatus can be installed at non-critical, low-priority locations onboard a vessel. These locations might include the flying bridges, or available railings along the side of the vessel. The apparatus does not require installation in critical, high-priority areas, such as on top of the bridge or on an antenna tower, which are reserved for critical navigation, communication, and safety equipment.

The different advantageous embodiments further provide a system for communication between vessels and remote sites that use small data packets. Small data packets can be transmitted and received in very short periods of time, even using inexpensive low bandwidth, thereby only requiring satellite connections for only seconds or minutes, in comparison to large data packets that require hours of connected air time and/or expensive high bandwidth. A satellite antenna for short low bandwidth connections can be a fixed simple zero-maintenance small antenna, for example, in comparison to long and/or high bandwidth connections, which require a costly large dish antenna with motorized gimbaled articulation, complex tracking system, and high maintenance requirements.

The different advantageous embodiments further provide a system and tool that contributes to the operating efficiency of a vessel. This system shortens the turn-around time between collecting and transmitting performance data from a vessel to a remote server, where the data can be analyzed and a recommendation or advisory generated and returned to the vessel. This provides the vessel with an opportunity to improve its operating safety and efficiency even during a single passage. This system further provides timely data for the vessel owner, operator, and/or fleet manager with regard to asset management and validation. The system allows a remote server to collect relevant performance and environmental data in a timely manner and return alerts and recommendations with regard to the situational awareness of a vessel, such as alerts to extreme weather conditions or piracy activity. The system provides a tool whereby users onboard a vessel can initiate reports, requests, or alerts in case of special events that may occur between the normally scheduled communications during a voyage.

The different advantageous embodiments further provide important information that, when made available to a remote site with resources to conduct advanced performance analysis, allows accurate and timely remote monitoring of vessel operating efficiency, including fuel consumption, carbon emission indexing monitoring and verification for credits and trading, and for timely management of vessel and fleet operating efficiencies. Advisory feedback, also delivered by the different advantageous embodiments, can include changing of route direction or speed, using a different ship class for a given task, changing propeller design or hull coating type, or conducting other specific unscheduled maintenance. Analysis of operating performance data provided via the different advantageous embodiments can indicate when such changes or upgrades will be most cost-effective or necessary to meet other requirements such as seaworthiness, maintain sufficient speed for on-time arrival, or other critical performance criteria.

The different advantageous embodiments allow automated updating of vessel computer performance models that are used in voyage optimization software, which simulates vessel voyages while taking into account environmental conditions such as wind, waves, and currents. As vessel computer performance model improves, so does the accuracy of the simulation results of the optimization software. The different advantageous embodiments increases situational awareness, including anti-piracy functionality, by collecting relevant information from the vessel's local vicinity that can be analyzed in near real-time at a remote site and provide alerts of abnormalities in behavior of neighboring vessels that merit closer attention. Such information is only relevant and useful when notification of such events occurs with a minimum of delay. For example, receiving alerts of piracy occurring in the vessel's local vicinity is important if given within a few hours of the event, but this kind of information is less useful if it is received, for example, more than eight hours later.

The different advantageous embodiments can also be used to issue short text messaging between a vessel and a remote site, including sending and receiving alerts, including request for local weather updates, alarms of storms, extreme waves, or piracy occurring in the vessel's local vicinity.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a sensor system configured to monitor time, position, heading, speed, motions, environmental conditions, and performance data for a vessel associated with the apparatus, and generate data about the vessel including a flex, a stress, a strain, an orientation, a rotation, and an acceleration of the vessel and an environment around the vessel;
a computer system connected to the sensor system, wherein the computer system is configured to receive the data from the sensor system, generate vessel information about the data, and send the vessel information to a remote location;
a satellite transceiver connected to the computer system, wherein the satellite transceiver is configured to send the vessel information to and receive other information from the remote location;
an automatic identification system;
wherein the data further includes shipboard conditions, encryption information for uploading or downloading large files at a next opportunity with a suitable connection, emergency SOS calls, personal messages from crew members, reports of extreme weather in a local environment, reports of suspicious activity by other vessels in the environment, and crew-adjusted routing information; and
wherein the shipboard conditions include motions, accelerations, a tilt, roll, a yaw, a pitch, a platform movement, an engine performance, a fuel flow, carbon dioxide ($CO_2$) emissions, and local environmental conditions.

2. The apparatus of claim 1, wherein the satellite transceiver is configured to send the vessel information in short data packets, the short data packets configured for short data bursts over a satellite network, the satellite network comprising a low earth orbit satellite constellation, the low earth orbit satellite constellation comprising a number of satellites at a number of altitudes between approximately 160 and 2000 kilometers.

3. The apparatus of claim 1, wherein the sensor system further comprises:
a number of sensors configured to detect a presence and movement of other vessels in an environment around a vessel associated with the apparatus.

4. The apparatus of claim 1, wherein the sensor system further comprises:
a number of sensors configured to detect engine status, engine performance, fuel flow, temperature, through-water velocity, local radar, wave radar, sea surface temperature, motions, single strain factors, and multiple strain factors for the vessel associated with the apparatus.

5. The apparatus of claim 1, wherein the sensor system further comprises:
one or more high integrity global positioning systems configured to monitor position, orientation, motions, and stresses of the vessel.

6. The apparatus of claim 1, wherein the computer system is further configured to acquire, integrate, compress, and encode the data collected from the sensor system to form a first number of short data packets.

7. The apparatus of claim 6, wherein the computer system is further configured to manage the transmission of the first number of short data packets to the remote location.

8. The apparatus of claim 6, wherein the computer system is further configured to manage the reception of a second number of short data packets from the remote location; wherein the second number of short data packets include weather information for an environment around the vessel, weather information for a projected environment on a vessel route, software-enabling licensing information for certain software functionality of a vessel computer, and personal short messages directed to crew members.

9. The apparatus of claim 1, wherein the remote location further comprises:
an analysis system configured to receive a first number of short data packets transmitted by the computer system of the apparatus, analyze the data collected from the sensor system of the apparatus, and generate a second number of short data packets in response to the data collected; wherein the second number of short data packets are generated by the computer applying a number of policies that include a time arrival policy, a fuel efficiency during a voyage policy, a following a prescribed route policy, a safe operating standards policy, an aircraft landing parameters policy, a launch operations parameters policy, a re-fueling at sea parameters policy, a boarding a vessel at sea parameters policy, a parameters for navigating in close proximity to a number of other vessels and/or objects policy.

10. A method for determining vessel or fleet tactical readiness from a remote site, the method comprising:
receiving a first number of data packets from a vessel using a satellite transceiver;
decoding the first number of data packets to retrieve collected data; and
analyzing the collected data using a number of policies to determine whether the vessel meets a number of parameters required for a given task;
wherein the given task is selected from a list including a tactical operation, a launch operation, an aircraft landing operation, a re-fueling at sea operation, an operation involving navigating in close proximity with other vessels or obstacles, and an operation performing a number of operations in poor or zero visibility conditions; and
wherein the number of policies include at least one set of parameters, and wherein the number of policies include on time arrival, fuel efficiency during a voyage, following a prescribed route, safe operating standards, aircraft landing parameters, launch operations parameters, re-fueling at sea parameters, boarding a vessel at sea parameters, parameters for navigating in close proximity to a number of other vessels and/or objects, and/or any other suitable policy, and wherein the first number of short data packets are configured for short data burst transmission over the satellite communication system, the satellite communication system comprising a number of satellite transceivers connected to the computer system and a low earth orbit satellite constellation, the low earth orbit satellite constellation comprising a number of satellites at a number of altitudes between approximately 160 and 2000 kilometers.

11. The method of claim 10 further comprising:
generating at least one of instructions, information, requests, and alerts in response to the collected data to form a second number of short data packets; and
transmitting the second number of short data packets to the vessel using the satellite transceiver;
wherein the second number of short data packets includes commands selected from a list comprising a launch command, a vessel route update, and information about aircraft projected to use the vessel as a landing platform.

12. An apparatus comprising:
a data manager configured to receive a first number of short data packets from a computer system associated with a vessel using a satellite communication system, decode the number of short data packets to retrieve data about vessel including a flex, a stress, a strain, an orientation, a rotation, and an acceleration of the vessel and an environment around the vessel, responsive to a determination that a response is needed, form a second number of short data packets for the response, and transmit the second number of short data packets to the computer system associated with the vessel using the satellite communication system, wherein the response includes an advisory notice regarding changing of route direction or speed, using a different ship class for a given task, and changing propeller design or hull coating type;
an analysis system configured to analyze the data retrieved, determine tactical readiness of the vessel, determine whether the response is needed, generate at least one of instructions, information, requests, and alerts in response to the determination of tactical readiness and determination that the response is needed, wherein the data manager uses the at least one of instructions, information, requests, and alerts generated to form the second number of short data packets;
wherein the data manager is further configured to manage the reception of a number of short data packets between the computer system associated with the vessel and the apparatus; and wherein the first number of short data packets are configured for short data burst transmission over the satellite communication system, the satellite communication system comprising a number of satellite transceivers connected to the computer system and a low earth orbit satellite constellation, the low earth orbit satellite constellation comprising a number of satellites at a number of altitudes between approximately 160 and 2000 kilometers.

13. A computer program product having computer usable program code stored on a computer readable storage medium, the computer usable program code executed by a computer to:
receive collected data about an environment and a vessel in the environment from a sensor system configured to monitor a time, a position, a heading, motions, environmental conditions, and performance data for the vessel including a speed, a flex, a stress, a strain, an orientation, a rotation, and an acceleration of the vessel and an environment around the vessel;
encode the data to form a first number of short data packets;
determine whether a report is needed;
responsive to a determination that the report is needed, transmit the first number of data packets to a remote server using a satellite transceiver;
receive a first number of data packets from a vessel using a satellite transceiver, wherein the satellite transceiver is configured to send the vessel information in short data packets, the short data packets configured for short data bursts over a satellite network, the satellite network comprising a low earth orbit satellite constellation, the low earth orbit satellite constellation comprising a number of satellites at a number of altitudes between approximately 160 and 2000 kilometers;
decode the first number of data packets to retrieve collected data; and
analyze the collected data using a number of policies to determine whether the vessel meets a number of parameters required for a given task.

14. The computer program product of claim 13, the computer usable program code further executed by the computer to:
analyze data received from one or more high integrity global positioning systems to monitor position, orientation, motions, and stresses of the vessel;
in response to analyzing the data, transmit an alert, wherein the alert includes information associated with safety and/or efficiency of a vessel, environment, route, operating parameter, emergency weather reports, routing advisory information, notices that a large file is waiting to be downloaded the next time the vessel has access to a broadband connection, alerts of storms, typhoons, hurricanes, rogue waves, and piracy activity.

15. The computer program product of claim 13, the computer usable program code further executed by the computer to:
decode a second number of short data packets received from the remote server to retrieve information, wherein the second number of short data packets is received using the satellite transceiver.

16. The computer program product of claim 13, the computer usable program code further executed by the computer to:

determine at least one of whether a reporting schedule indicates the report is needed, whether a request for an unscheduled report has been received, and whether an unscheduled automated alert is triggered that requires a report.

\* \* \* \* \*